Figure 6:
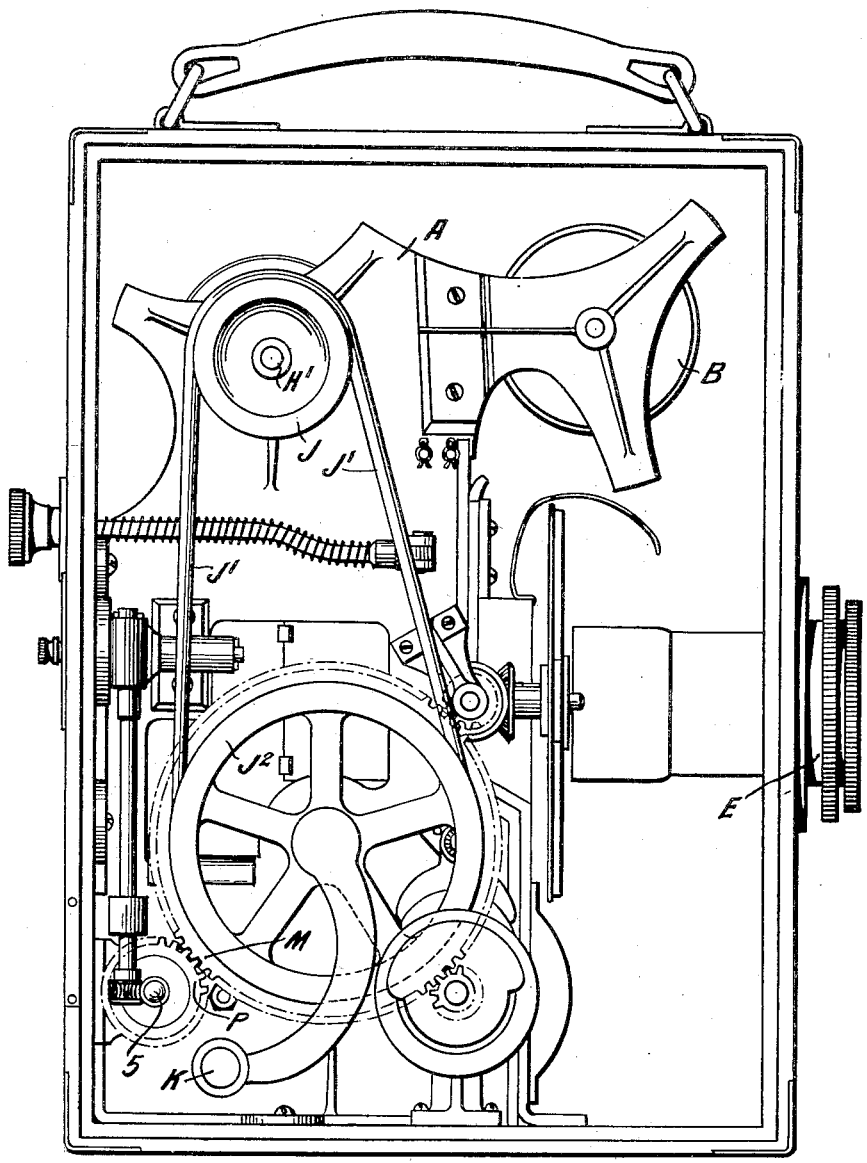

H. FISHER.
CONTROLLING THE FEED OF CINEMATOGRAPH FILMS.
APPLICATION FILED JUNE 6, 1914.
1,126,437.
Patented Jan. 26, 1915.
3 SHEETS—SHEET 1.
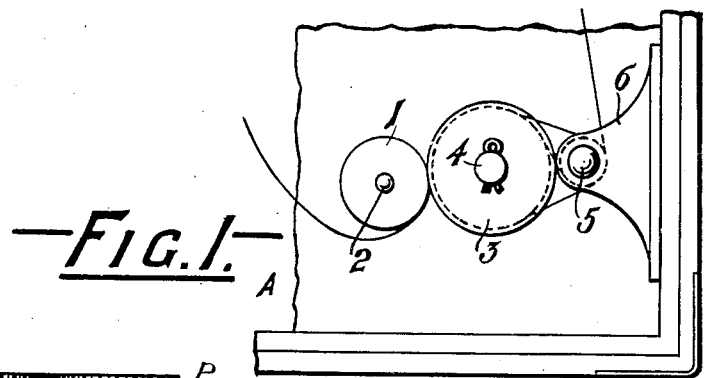
FIG. 1.
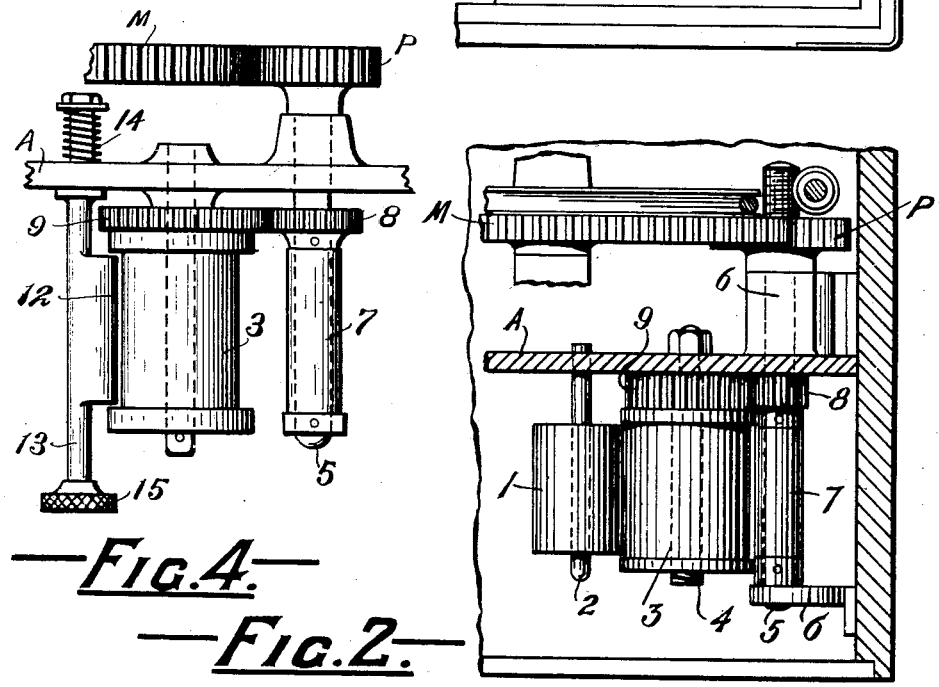
FIG. 4.
FIG. 2.
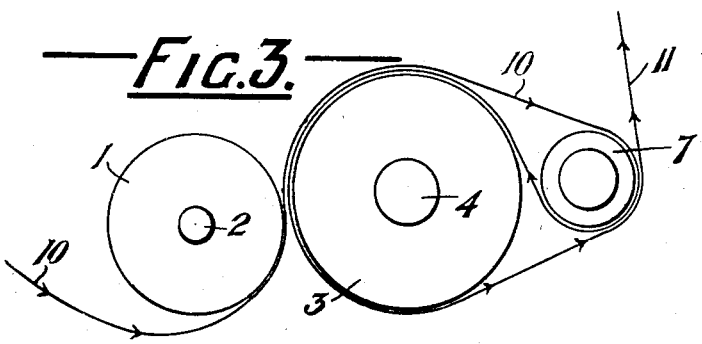
FIG. 3.
Witnesses
B. M. Allen
J. B. Le Blanc
Inventor
Horace Fisher
By Serrell & Son
his Attorneys

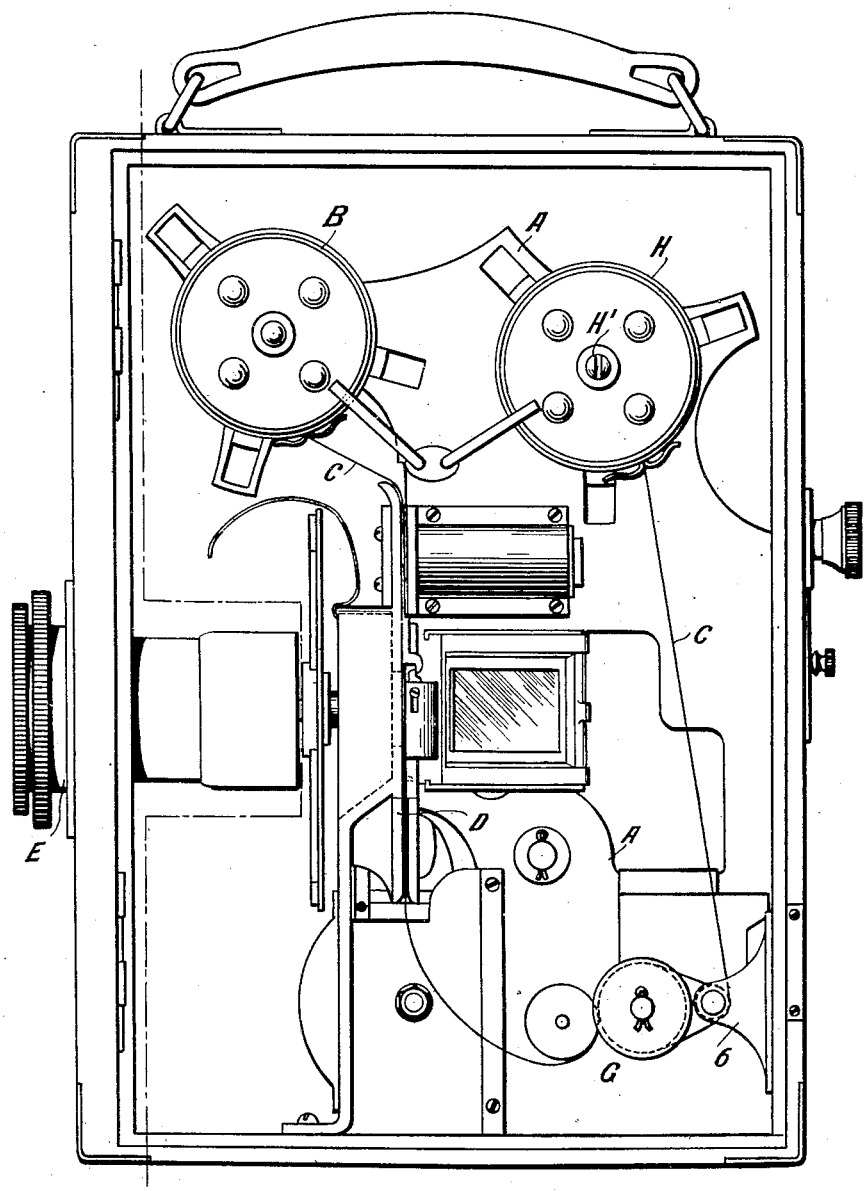

UNITED STATES PATENT OFFICE.

HORACE FISHER, OF LETCHWORTH, ENGLAND, ASSIGNOR TO WILLIAM EDWARD GARFORTH, OF PONTEFRACT, YORKSHIRE, ENGLAND.

CONTROLLING THE FEED OF CINEMATOGRAPH-FILMS.

1,126,437.     Specification of Letters Patent.     Patented Jan. 26, 1915.

Application filed June 6, 1914. Serial No. 843,380.

*To all whom it may concern:*

Be it known that I, HORACE FISHER, photographic works manager, a subject of the King of Great Britain, residing at 12 Baldock road, Letchworth, Hertfordshire, England, have invented certain new and useful Improvements in Controlling the Feed of Cinematograph-Films, and of which the following is a specification.

This invention refers to apparatus for controlling the feed of films employed in cinematographic apparatus, and the object of the invention is to provide a controlling mechanism which shall deliver the film from the feed apparatus to the winding-up spindle at a regular speed.

In carrying out the invention three rollers or equivalent members are provided mounted on parallel axes and with their peripheries at a short distance apart. The film, after passing beneath the first roller from the feed mechanism, passes over the top of the second roller, over the top and around the third roller and over the top surface and in great part around the second roller, and then beneath the third roller and in contact with the film already thereon and so to the take-up mechanism on which the film is wound. When the second roller is driven, a regular feed of the film takes place, which feed is arranged to be in the proper proportion to the amount of film passed or drawn down by the feed mechanism.

The invention will be fully described with reference to the accompanying drawings, whereon, Figure 1 is an elevation and Fig. 2 a plan view of the controlling mechanism, according to this invention, detached, Fig. 3 being a diagram view in elevation illustrating the course of the film around the rollers. Fig. 4 shows in plan a modified construction of the controlling mechanism. Figs. 5 and 6 show a cinematographic camera having the invention applied thereto. Fig. 5 being a left-hand side elevation of the camera with the side plate of the case removed. Fig. 6 a right-hand side elevation of the camera also with the side plate removed.

Referring to Figs. 1 to 3 of the drawings, the controlling device consists of a roller 1, freely revoluble upon a stud axle 2 carried by a framework A. A second roller 3 is also revolubly mounted on a stud axle 4 carried by the same framework A, and is preferably, as shown, of larger diameter than the first roller 1, and the periphery of the roller 3 is not in surface contact with the periphery of the roller 1. Mounted either freely or fixed on a revoluble shaft 5, carried in bearings 6 in the framework of the apparatus, is the third roller 7, and the shaft 5 is positively driven, in the construction shown, by the mechanism of the apparatus. The axle of the roller 7 carries a pinion 8 engaging a spur wheel 9 fixed to the roller 3, the wheels 8 and 9 being so proportioned that the surface speed of the roller 3 corresponds to the rate of feed of the film.

The mode of passing the film over the rollers 1, 3 and 7 will be clearly seen by reference to the diagram at Fig. 3, where the film at 10 passes from the intermittent feed mechanism of the apparatus beneath the roller 1 over the top of the driven roller 3, over the top and around the roller 7 and back over the top and in great part around the second roller 3 between a portion of the film and the roller, and then beneath the third roller 7, and so at 11 extending to the take-up mechanism.

It will now be observed, as indicated by the arrow heads at Fig. 3, that the film passing from the roller 1 over the roller 3, travels in the opposite direction to that part of the film extending from the roller 7 over the roller 3, and consequently the film cannot move in the opposite direction to that of the arrow heads at 10, while owing to the driving of the roller 3 a regular delivery of the film is attained.

Referring to Figs. 5 and 6, wherein the invention is shown applied to a cinematographic camera, the roll of film to be passed through the apparatus is contained in a case B, which is non-revoluble but carries within it a revoluble reel, the film C passing through a slot, over the face of a front plate D of the film passage, and in front of an aperture in the plate, which aperture is located opposite the lens E. At or near the lower end of the plate D, intermittent feed mechanism is located which may be of any known character adapted to intermittently draw the film from the case B. From the intermittent feed mechanism the film then passes to the controlling device which we have described with reference to Figs. 1 to 3, and which will be recognized at G, Fig. 5. From the controlling device G the film C passes to a reel within a stationary case H, and the reel is carried upon a revoluble spindle H¹, Fig. 5, upon which spindle, as shown at Fig. 6, is a pulley J driven by a belt J¹, which belt passes over a pulley J² mounted upon a shaft which is revolved by an operating handle K.

Where the controlling device G is driven, as described, so as to deliver the film to the take-up reel at a regular speed, it is requisite that there should be a possibility of slip in the drive of the take-up spindle, and in the example shown the belt J¹ can slip on the pulley J. The spur wheel M which is rotated by the handle K drives a pinion P, Fig. 6 fixed on the shaft 5 which carries the third roller 7.

In some cases, referring to Fig. 2, the rollers may be arranged so that the spaces between them are open for the insertion of the film sidewise in the camera, as for instance, the roller 3 might be constructed without the outer flange and the bracket 6 may be dispensed with.

In some cases what has been termed the first roller may be constructed as a guiding face, capable of being moved away or distanced from the second roller to facilitate the insertion of the film, and moreover this guiding face may be spring controlled; such a construction is shown at Fig. 4 of the drawings, where the guiding face indicated at 12 consists of a lateral rounded extension of a spindle 13, adjustable about its axis in the frame A, the guiding face 12 serving the office of the roller 1 at Fig. 2.

The spindle 13 extends through the frame A and is fitted with a spring 14, one end of which is fixed to the frame A and the opposite end to the spindle 13, so that the guiding face has a tendency to turn downward relatively to Fig. 4, but is prevented from passing downward beyond a position in which the guiding face is horizontal, as shown while at the same time it is free to be turned upward by the operator by means of the knob 15 against the action of the spring 14, so as to distance the guiding face 12 from the roller 3 for the insertion of the film from the side.

The roller 7 is, as in the construction at Fig. 2, mounted on the shaft 5, being retained thereon by a pinned collar at the outer end of the shaft, and as before the shaft 5 has pinned thereon a pinion 8 gearing with a spur wheel 9 on the drum 3, and the shaft 5 is driven from the driving mechanism of the apparatus. This arrangement of mechanism operates similarly to that described with reference to Fig. 2, except that the guiding face 12 can be easily distanced from the roller 3 and the outer bearing bracket for the shaft 5 is dispensed with, so that the film can be placed in position from the side of the apparatus without having to thread it between the rollers, and also the guiding face, being elastically retained in position, will yield somewhat and have an elastic action on the passing film, calculated to prevent breakage should the film be subjected to severe strain. By altering the position of the third roller 7 relatively to the intermediate roller, a greater or less amount of contact of the film with the said intermediate roller 3 may be secured according as to whether a greater or less gripping control is desired to be effected.

What I claim as my invention and desire to secure by Letters Patent is:—

1. In cinematographic apparatus in which a film is intermittently drawn from a source of supply past a lens by a feed device and from thence is taken up on a frictionally driven film-receiving spindle; mechanism to insure a regular speed of travel of the film to said receiving spindle, comprising in combination a roller adapted to be driven at a surface speed proportionate to the rate of feed of the film, driving means for said roller, a second roller adjacent to aforesaid roller and adapted to rotate at the same surface speed as said first roller said rollers being carried on parallel horizontal spindles supported by a stationary frame carrying the mechanism of the apparatus, and guiding means to direct the film from said feeding device to said first roller, said film passing from said guiding means over the top of said first roller and then over the top of and around a substantial portion of said second roller, then back over the top of and around a substantial portion of said first roller and under the film already passing over said first roller the film then passing under said second roller and over the portion of the film thereon and away to said film-receiving spindle, substantially as set forth.

2. In cinematographic apparatus in which a film is intermittently drawn from a source of supply past a lens by a feed device and from thence is taken up on a frictionally driven film-receiving spindle; mechanism to insure a regular speed of travel of the film to said receiving spindle, comprising in combination a roller adapted to be driven at a surface speed proportionate to the rate of feed of the film, driving means for said roller, a second roller adjacent to the aforesaid roller and adapted to rotate at the same surface speed as the first roller said rollers being carried on parallel horizontal spindles supported by a stationary frame carrying the mechanism of the apparatus, and a third roller rotatably carried on a stationary spindle parallel with the axes of said first and second rollers and at a short distance from said first roller, said film passing below said third roller over the top of said first roller, then over the top of and around a substantial portion of said second roller then back over the top of and around a substantial portion of said first roller and under the film already passing over said first roller the film then passing under said second roller and over the portion of the film thereon and away to said film-receiving spindle, substantially as set forth.

3. In cinematographic apparatus in which a film is intermittently drawn from a source of supply past a lens in one wall of the case of the apparatus by a feed device operated through a gear wheel on a main shaft which is rotatably carried by a stationary frame within said case and is adapted to be rotated from the exterior of said case to which shaft a pulley is fixed, a driving belt passing over said pulley and over a pulley fixed to a rotatable film-receiving spindle so that by rotating said shaft said film-receiving spindle is rotated and the feed device operated; mechanism to insure a regular speed of travel of the film from said feed device to said film-receiving spindle, comprising in combination a roller rotatably carried by said frame, a spur wheel at one end of said roller, a second roller adjacent to aforesaid roller, a spindle passing through the axis of said second roller and rotatably carried by said frame parallel to the axis of the first roller, a pinion fixed to said spindle gearing with said spur wheel on said first roller, said pinion and spur wheel being of such diameters as to insure said first and second rollers rotating at the same surface speed, a second pinion fixed to said spindle which second pinion gears with said gear wheel operating said feed device, and guiding means to direct the film from said feeding device to said first roller, said film passing from said guiding means over the top of said first roller and then over the top of and around a substantial portion of said second roller, then back over the top of and around a substantial portion of said first roller and under the film already passing over said first roller the film then passing under said second roller and over the portion of the film thereon and away to said film-receiving spindle, substantially as set forth.

4. In cinematographic apparatus in which a film is intermittently drawn from a source of supply past a lens in one wall of the case of the apparatus by a feed device operated through a gear wheel on a main shaft which is rotatably carried by a stationary frame within said case and is adapted to be rotated from the exterior of said case to which shaft a pulley is fixed, a driving belt passing over said pulley and over a pulley fixed to a rotatable film-receiving spindle so that by rotating said shaft said film-receiving spindle is rotated and the feed device operated; mechanism to insure a regular speed of travel of the film from said feed device to said film-receiving spindle, comprising in combination a roller rotatably carried by said frame, means to impart rotation to said roller from said main shaft at a surface speed proportional to the rate of feed of the film, a second roller adjacent to the aforesaid roller and adapted to rotate at the same surface speed as the latter, a spindle carried by said frame to rotatably support said second roller parallel with the axis of the first roller, and guiding means to direct the film from said feeding device to said first roller, said film passing from said guiding means over the top of said first roller and then over the top of and around a substantial portion of said second roller, then back over the top of and around a substantial portion of said first roller and under the film already passing over said first roller the film then passing under said second roller and over the portion of the film thereon and away to said film-receiving spindle, substantially as set forth.

5. In cinematographic apparatus in which a film is intermittently drawn from a source of supply past a lens in one wall of the case of the apparatus by a feed device operated through a gear wheel on a main shaft which is rotatably carried by a stationary frame within said case and is adapted to be rotated from the exterior of said case, to which shaft a pulley is fixed, a driving belt passing over said pulley and over a pulley fixed to a rotatable film-receiving spindle so that by rotating said shaft said spindle is rotated and the feed device operated; mechanism to insure a regular speed of travel of the film from said feed device to said film-receiving spindle, comprising in combination a roller rotatably carried by said frame, a spur wheel at one end of said roller, a second roller adjacent to aforesaid roller, a spindle passing through the axis of said second roller and rotatably carried by said frame parallel to the axis of the first roller, a pinion fixed to said spindle gearing with said spur wheel on said first roller, a second pinion fixed to said spindle which second pinion gears with said gear wheel operating said feed device, and a third roller rotatably carried on a stationary spindle parallel with the axes of said first and second rollers and at a short distance from said first roller, said film passing from said feeding device below said third roller over the top of said first roller, then over the top of and around a substantial portion of said second roller, then back over the top of and around a substantial portion of said first roller and under the film already passing over said first roller, the film then passing under said second roller and over the portion of the film thereon and away to said film receiving spindle, substantially as set forth.

In witness whereof I have hereunto set my hand in the presence of two witnesses.

HORACE FISHER.

Witnesses:
 GRIFFITH BROWN,
 WILLIAM A. MARSHALL.